US008117662B2

(12) United States Patent
Hochfield

(10) Patent No.: US 8,117,662 B2
(45) Date of Patent: Feb. 14, 2012

(54) SMARTCARD SYSTEM

(75) Inventor: Barry Sim Hochfield, Glasgow (GB)

(73) Assignee: ECEBS Limited, London (GB)

( * ) Notice: Subject to any disclaimer, the term of this patent is extended or adjusted under 35 U.S.C. 154(b) by 794 days.

(21) Appl. No.: 12/064,848

(22) PCT Filed: Aug. 29, 2006

(86) PCT No.: PCT/GB2006/003205
§ 371 (c)(1),
(2), (4) Date: Aug. 11, 2008

(87) PCT Pub. No.: WO2007/026139
PCT Pub. Date: Mar. 8, 2007

(65) Prior Publication Data
US 2008/0320597 A1    Dec. 25, 2008

(30) Foreign Application Priority Data
Aug. 30, 2005 (GB) .................................. 0517615.1

(51) Int. Cl.
*G06F 7/04* (2006.01)
(52) U.S. Cl. .............................. 726/26; 713/172; 705/65
(58) Field of Classification Search .................... 705/66
See application file for complete search history.

(56) References Cited

U.S. PATENT DOCUMENTS

| 5,506,397 | A * | 4/1996 | Hoshino | 235/492 |
|---|---|---|---|---|
| 6,547,150 | B1 * | 4/2003 | Deo et al. | 235/492 |
| 6,742,120 | B1 * | 5/2004 | Markakis et al. | 713/184 |
| 6,754,886 | B1 * | 6/2004 | Merk et al. | 717/116 |
| 6,811,077 | B2 * | 11/2004 | Durand et al. | 235/379 |
| 7,117,364 | B1 | 10/2006 | Hepper et al. | |
| 7,243,853 | B1 * | 7/2007 | Levy et al. | 235/492 |
| 7,850,066 | B2 * | 12/2010 | Breslin et al. | 235/375 |
| 2004/0143551 | A1 | 7/2004 | Jong | |
| 2005/0246546 | A1 * | 11/2005 | Takagi et al. | 713/182 |
| 2006/0174352 | A1 * | 8/2006 | Thibadeau | 726/27 |
| 2006/0200864 | A1 * | 9/2006 | Nakanishi et al. | 726/27 |

FOREIGN PATENT DOCUMENTS

DE    199 47 986 A1    4/2001
WO    WO 03/049056 A2    6/2003

* cited by examiner

*Primary Examiner* — Matthew Smithers
(74) *Attorney, Agent, or Firm* — Gardere Wynne & Sewell LLP

(57) ABSTRACT

A programmable smartcard device (10) carries a file system (22, 24) and operating software enabling the on-device file system to interface with at least one off-device file and/or application. It also has a script engine (32) capable of running one or more Application Protocol Data Units (1APDUs') associated with a particular form of transaction so as to modify the structure and/or content of the file system, or the commands to be used for accessing the file system or any security conditions associated therewith. The smartcard device (10) is provided with comparator means (34) configurable by a security APDU run by the script engine (32) so that it operates in use to compare the commands carried out in implementing the transaction with one or more reference commands and to restrict or prevent further access or modifications to the on-device data, file system, commands or security conditions in dependence on the outcome of the comparison carried out by the comparator means (34). Thus, the smartcard device can, because the comparator (34) is configured for each different kind of transaction to be carried out, provide improved security within the contraints of memory storage and processing power available on the smartcard device itself.

13 Claims, 1 Drawing Sheet

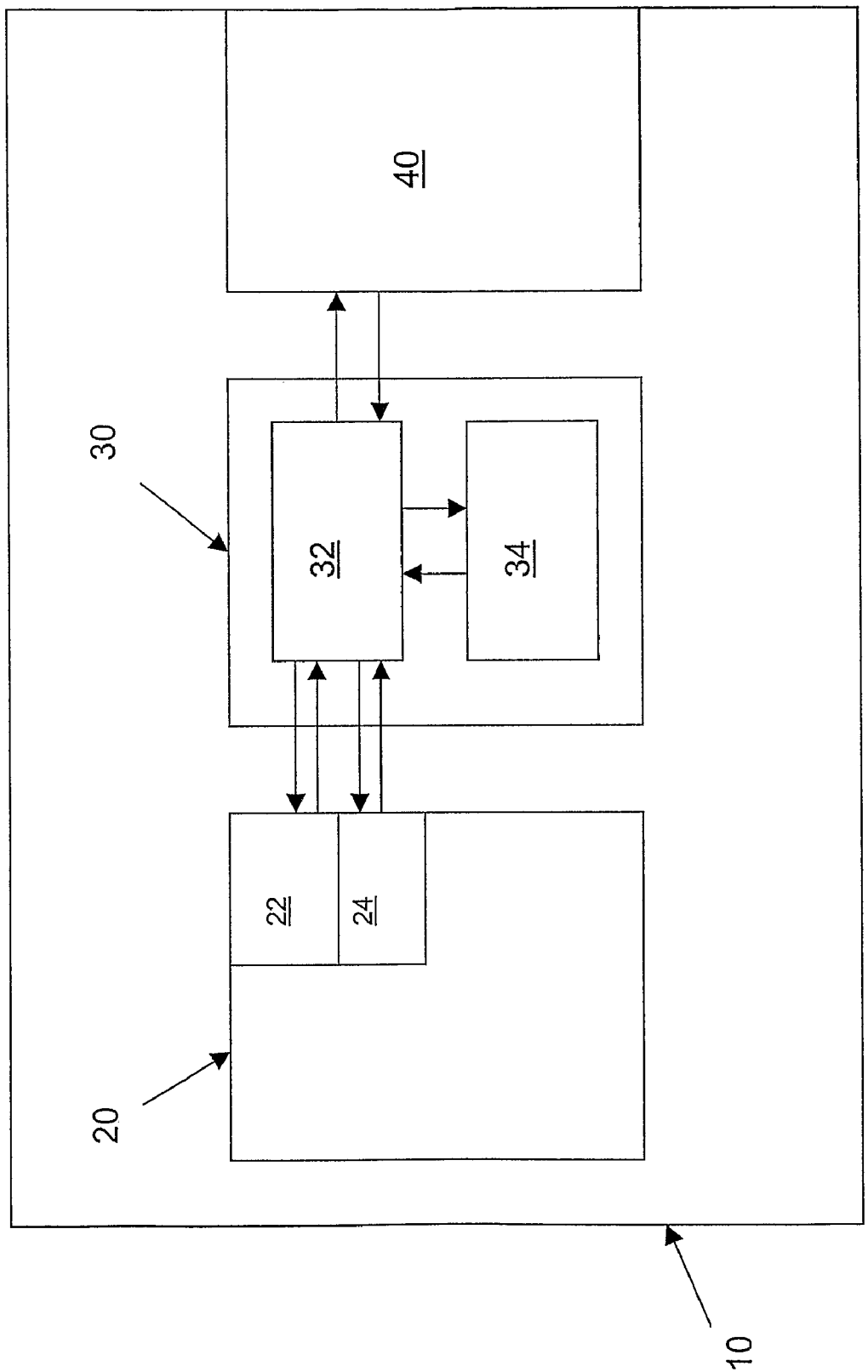

SMARTCARD SYSTEM

The invention concerns an improvement to the smartcard system described in International Patent Application No WO03/049056 and, in particular, it concerns the possibility of improved security arrangements in such systems. Such a smartcard system includes a programmable smartcard device carrying a file system and operating software enabling the on-device file system to interface with at least one off-device file and/or application and comprising a script engine capable of running one or more Application Protocol Data Units ('APDUs') so as to modify the structure and/or content of the file system, or the commands to be used for accessing the file system or any security conditions associated therewith.

In such systems, a programmable smartcard device carries one or more application and/or data files stored in memory on the device itself. For example, the files may hold details of the card carrier's bank balance, or details of financial transactions which have been, or are to, be carried out. To safeguard the integrity of this data, the memory holding these files and the data they contain can be accessed only by means of a processor on the card itself. That processor includes a script engine which is capable of running a script uploaded to it from an interface device into which the card is inserted or to which the card can be connected, so as to modify the structure or content of the file system on the card, or the commands to be used for accessing the file system or any security conditions associated therewith.

In the system of International Patent Application No WO03/049056 scripts are written as a file formatted in web (internet) standard language for self-describing messages and are transmitted securely over the internet from a central 'back room' to one or more interface devices where they can be loaded onto the smartcard devices of one or more users. Thus, since it is possible to transmit files in web standard languages such as eXtensible Markup Language ('XML') securely over the internet, it is possible to distribute upgrades to the applications software held on the smartcard device or to modify or reformat data on the cards used in the system quickly and conveniently using the internet while maintaining a good level of security.

However, while the basic system of International Patent Application No WO03/049056 is secure, we have appreciated that it may still be desirable to try to improve the security of the system further. For security critical smartcard applications such as those which handle financial transactions, the sequence of commands and responses into and out of the smartcard device should follow a specific flow. While one can develop application specific software to run on the card, which only responds normally if the next command(s) expected is received and which, conversely, throws an error if the command is not the expected one, this approach has all the usual drawbacks in terms of management, particularly of upgrades and modifications.

In accordance with the invention, the smartcard device is characterised in that it comprises comparator means configurable by a security APDU run by the script engine and operable to compare the commands carried out in implementing an application to access and/or modify the on-device data or file system or the commands to be used for accessing the system or any security conditions associated therewith with one or more reference commands and to restrict or prevent further access or modifications to such data, file system, commands or security conditions in dependence on the outcome of the comparison carried out by the comparator means.

Thus, in the smartcard system described in International Patent Application No WO03/049056 a script engine is used to set up the card. Improved security can be provided by setting up the card so that the card expects and so monitors the occurrence of a certain sequence of commands, either by comparison of the command code alone or by comparison of both code and operands.

The invention also provides a method for configuring the smartcard device referred to above.

An embodiment of the invention will now be described in detail, by way of example, with reference to the drawing which is a schematic diagram of a smartcard device in accordance with the invention.

A smartcard device 10 used in system of the kind outlined above is shown schematically in the drawing.

The device 10 includes on-device memory 20 in which are stored files 22 and 24 and a processor 30 which includes a script engine 32 and a configurable comparator 34. As previously mentioned, on-device memory 20 is only accessible by processor 30 and cannot be accessed directly from outside the smartcard device 10. The device 10 also includes interface means 40, which allows the device 10 to interact with an external interface device (not shown).

For the purposes of the example described, it is assumed that stored files 22 and 24 contain data representing, respectively, a current account balance and the last previous account balance for a financial account of some kind held by the smartcard device's user. When the card is used to authorise the transfer of funds from the user's account, the device 10 interacts with an interface device to upload a file containing one or more Application Protocol Data Units ('APDUs') which are run by the script engine 32 on the device 10 to modify the content of various files held in the device memory 20. The transaction may be quite complex and involve a number of commands which modify the content of a number of files but, for simplicity, only a single modification is considered here.

When the card's user uses the device 10 to authorise payment to a third party, the current balance held in file 22 is copied to file 24 which stores the last previous account balance and then the current balance data in file 22 is modified to show the new smaller balance.

In such a transaction, one would expect to find in the sequence of commands in the APDU run by the script engine 32 to effect the transaction, the following pair of commands COPY value in file 22 to file 24

WRITE new current balance to file 22

In the system described above, the smartcard device 10 is inserted into or connected to an interface device which, when a transaction is to be initiated, uploads to the device processor 32 one or more APDUs which are then run by the script engine 32 to modify the data in inter alia files 22 and 24. In accordance with the invention, the APDUs include a security or 'watchdog' APDU which is used to configure the comparator 34 in a manner appropriate to the transaction to be carried out. In effect, the security APDU provides reference commands or code against which the commands run by the script engine 32 are checked.

In the example described above, the security APDU may, when run by the script engine 32, configure the comparator 34 so that it carries out comparisons so as to detect the expected pair of commands 'COPY value in file 22 to file 24' and "WRITE new current balance to file 22'. Unless the comparator makes a positive match, the transaction is aborted.

The example given is a very simple one but it will be understood that the comparator 32 can be configured to monitor a much longer sequence of commands in the same way.

Further, the comparator 32 may be configured to compare only parts of commands with the references provided by the security APDU. For example, it may determine whether a 'COPY' command contains the name or identifier of a file from which it may be expected that data will be copied in the context of the particular transaction being carried out. Alternatively, only the operands within commands, or the sequence in which they occur may monitored, for example, to check that a 'COPY' command is always followed by a 'WRITE' command.

In some circumstances, it may be appropriate to configure the comparator 32 to cause a transaction to be aborted if a match is detected. In the transaction outlined above, for example, there is no legitimate reason for the script engine 32 to copy from file 24 to file 22, so, if such a command is detected, it may mean that a fraud is being perpetrated. Thus, the comparator 34 could be configured to check for the presence of the command 'COPY from file 24 to file 22'as a basis for restricting or preventing further modification of files or data on the smartcard device 10.

Just as, when seeking a positive match to authenticate a transaction, a 'negative match' may be based on a partial comparison. For example, the comparator 34 may be configured simply to look for particular code such as the name of a particular on-device file, say, 'File 24', if that file should not be mentioned in a particular sequence of commands at all.

Alternatively, the comparator 34 may be configured to detect combinations of command code and operands. In the example given above, the comparator 34 might be configured to detect any command which requires copying from file 24, since such a command is not appropriate to the transaction to be effected.

In complex situations, whether a positive or negative match with references set by the script engine 32 and security APDU is desired, the comparator 34 may be configured to detect particular sequences of commands rather than single ones. If the expected command set is not a simple linear sequence but includes logic or arithmetic driven branching of the kind described in International Patent Application No WO2005/064555, then the script engine capabilities may be used to map these command paths through the comparator 34.

The comparator 34 can also be configured, where appropriate, to compare commands with a predetermined set or range of possible expected values rather than with a single one.

Thus, the 'expected command' script of APDUs and comparator act together like a state machine where the command(s) within the script represents the sequence of commands expected, either by detecting the commands which should be present or by detecting those which should not, and setting the state to 'error' if a particular comparison produces a particular predetermined result.

It will be appreciated that, because the comparator 34 provided on the smartcard device 10 is configurable by the script engine 32 in dependence on the security APDU(s) uploaded as part of the command sequence for each transaction as the transaction is about to take place, the comparator 34 can make checks appropriate to the particular type of transaction which is to be carried out.

Prior art devices outside the smartcard field have utilised checking or monitoring devices for making such comparisons but these have been 'hard wired' into the devices in question and, because of the need to provide for a number of different types of transaction, have required more processor power and/or memory storage than can be provided on a smartcard device. The use of a configurable comparator 34, configured for each transaction as it takes place, means that a level of security checking which has not been available in smartcard systems previously can now be provided within the constraints of the relatively small processor and memory available on a smartcard device.

In addition, the security APDUs for each type of transaction used by the script engine 32 to configure the comparator 34 can readily be modified as necessary if new fraudulent attacks on security are discovered or new forms of transaction are to be accommodated.

The invention claimed is:

1. A smartcard device, comprising:
on-device memory configured to store a plurality of files;
an interface operable to communicate with an external interface device, the external interface device operable to communicate one or more Application Protocol Data Units (APDUs) to the smartcard device;
a processor operable to communicate with the on-device memory, the processor comprising:
a script engine operable to execute the one or more APDUs to modify data on the smartcard device; and
a comparator operable to:
determine if a command sequence received from the external interface device corresponds to an expected reference command sequence stored on the smartcard device; and
prohibit the external interface device from accessing or modifying data on the smartcard device based on the determination.

2. The smartcard device of claim 1, wherein the comparator is operable to be configured by one or more security APDUs received from the external interface device and executed by the script engine.

3. The smartcard device of claim 2, wherein the one or more security APDUs updates reference data on the smartcard device, the reference data comprising the expected reference command sequence.

4. The smartcard device of claim 1, wherein the comparator is further operable to compare a code of an APDU executed by the script engine to modify on-device data, files, commands or security conditions with an expected reference code.

5. The smartcard device of claim 4, wherein the comparator is further operable to compare at least one operand of the APDU executed by the script engine with an expected reference operand.

6. The smartcard device of claim 1, wherein the command sequence implements an application on the smartcard device.

7. The smartcard device of claim 1, wherein the comparator is further operable to prohibit the external interface device from accessing or modifying data on the smartcard device when the command sequence received from the external interface device does not correspond to the expected reference command sequence stored on the smartcard device.

8. The smartcard device of claim 1, wherein the comparator is further operable to prohibit the external interface device from accessing or modifying data on the smartcard device when the command sequence received from the external interface corresponds to the expected reference command sequence stored on the smartcard device.

9. The smartcard device of claim 1, wherein the script engine is operable to execute one or more APDUs derived from at least one file formatted in a web (Internet) standard language for self-describing messages.

10. A method for configuring a smartcard device, comprising:
loading an application script from an external device to the smartcard device, the application script comprising at least one security APDU for modifying reference data associated with an on-device file system, the reference data comprising an expected reference command sequence; and executing the at least one security APDU by a script engine on the smartcard device to configure a comparator of the smartcard device, the comparator operable to:

determine if a command sequence received from the external device corresponds to the expected reference command sequence stored on the smartcard device; and prohibit the external device from accessing or modifying data on the smartcard device based on the determination.

11. The method of claim 10, wherein the application script is operable to modify definitions of the structure and content of the on-device file system, or a plurality of commands used to access the on-device file system or any security conditions associated therewith.

12. The method of claim 10, further comprising:

loading a plurality of different application scripts to the smartcard device, each of the application scripts having a respective security APDU, the respective security APDU being loaded to the smartcard device whenever a different application script is loaded; and reconfiguring the comparator each time the different application script is executed by the script engine.

13. The method of claim 10, wherein the application script and the at least one security APDU are each derived from at least one file formatted in a web (Internet) standard language for self-describing messages.

* * * * *